United States Patent [19]
Ogata

[11] Patent Number: 5,903,252
[45] Date of Patent: May 11, 1999

[54] ELECTRONIC WHITEBOARD APPARATUS

[75] Inventor: Takefusa Ogata, Saga-ken, Japan

[73] Assignee: Matsushita Electric Industrial Co., Ltd., Osaka, Japan

[21] Appl. No.: 08/942,303

[22] Filed: Oct. 1, 1997

[30] Foreign Application Priority Data

Oct. 8, 1996 [JP] Japan ................................... 8-266902

[51] Int. Cl.$^6$ ............................ G08C 21/00; G09G 3/38; G09G 5/00
[52] U.S. Cl. ........................ 345/105; 345/178; 178/18.03; 178/18.07
[58] Field of Search ................................ 345/2, 105, 156, 345/157, 173, 175, 178; 178/18.01, 18.03, 18.07

[56] References Cited

U.S. PATENT DOCUMENTS

| | | | |
|---|---|---|---|
| Re. 35,329 | 9/1996 | Murakami et al. | 345/157 |
| 4,857,908 | 8/1989 | Kogure et al. | 345/105 |
| 5,023,408 | 6/1991 | Murakami et al. | 178/18.07 |
| 5,134,388 | 7/1992 | Murakami | 178/18.03 |
| 5,274,362 | 12/1993 | Potvin | 345/178 |

*Primary Examiner*—Vijay Shankar
*Attorney, Agent, or Firm*—Stevens, Davis, Miller & Mosher, L.L.P.

[57] ABSTRACT

In a multi-plane electronic whiteboard apparatus, a drawing sheet is extended on a main roller and driven rollers so as to be folded back once by means of the intermediate driven roller. The main roller has a diameter larger than (at least not less than twice) the diameter of the driven rollers to ensure a space for forming the folded portion. A portion of the drawing sheet is exposed through an opening of a frame for serving as a drawing plane. The folded portion contributes to providing a total of four drawing planes. Therefore, it is possible to provide the multi-plane electronic whiteboard apparatus with a simple structure and at a low cost.

2 Claims, 6 Drawing Sheets

ELECTRONIC WHITEBOARD APPARATUS

FIELD OF THE INVENTION

This invention relates to an electronic whiteboard apparatus which is capable of providing multiple drawing planes as many (as four or more) by making use of an endless sheet moving system.

DESCRIPTION OF THE RELATED ART

There have conventionally been widely used electronic whiteboard apparatus which can optically read information drawn on a whiteboard and print out the information after converting it into electrical signals.

A conventional electronic whiteboard apparatus will be described below.

FIG. 8 is an arrangement view of a conventional electronic whiteboard apparatus. In FIG. 8, reference numeral 71 denotes a writing or drawing sheet; 72, a motor; 73, a main roller rotated by the motor 72 for moving the drawing sheet 71; 74, 75, 76 and 77, driven rollers which rotate as the drawing sheet 71 is moved by the rotation of the main roller 73; 78, a fluorescent lamp light source; 79, a reflector; 80, a focusing lens; 81, an image sensor; 82, a circuit unit; 83, a printer; and 84, print paper. As shown in FIG. 8, the drawing sheet 71 is extended on the main roller 73 and the driven rollers 74, 75, 76 and 77 in such a manner as to be folded by means of the driven roller 76, thereby making it possible to provide four drawing planes.

Operation of the conventional electronic whiteboard apparatus having the above-described arrangement will be described below.

The motor 72 first causes the main roller 73 to rotate so as to move the drawing sheet 71 in the direction of an arrow B. At this time, sentences and figures drawn on the drawing sheet 71 are read by an optical read system at a reading position P and then the data of the read sentences and figures are transmitted to the printer 83 through the circuit unit 82, the optical read system comprising the fluorescent lamp 78, reflector 79, focusing lens 80 and image sensor 81. The printer 83 makes a printed record on the print paper 84 according to the transmitted data.

In the above conventional electronic whiteboard apparatus, however, since the number of rollers on which the drawing sheet is extended is large, the resistance to movement of the drawing sheet increases, resulting in unstable movement of the drawing sheet. Further, it is necessary to reduce the diameter of each of the rollers as small as possible for the purpose of preventing the apparatus from getting larger in size. This causes the drawing sheet to be sharply bent at the rollers, giving rise to a problem that a chart and the like put on the drawing sheet for copying may come off when passing over the rollers.

In view of the above problems, an object of the present invention is to provide an electronic whiteboard apparatus in which a sheet can be moved stably even when it has multiple drawing planes up to as many as four or more, and a chart and the like put on the drawing sheet can also be copied.

SUMMARY OF THE INVENTION

The present invention provides an electronic whiteboard apparatus comprising: a long drawing sheet; a frame having an opening through which a portion of the drawing sheet is exposed; a main roller provided in the frame for moving the drawing sheet; first and second auxiliary rollers disposed in the frame so as to be opposed to the main roller in a horizontal direction with respect to the opening; a third roller disposed between the main roller and the first and second auxiliary rollers; a drive unit for rotating the main roller; a read unit for reading information drawn on the drawing sheet; and an output unit for outputting the information transmitted from the read unit, wherein the main roller has a larger diameter than the first, second and third auxiliary rollers, the drawing sheet is extended on the main roller and the first, second and third auxiliary rollers so as to be folded back for once by means of the third auxiliary roller, the drive unit rotates the main roller in such a manner that the portion of the drawing sheet exposed through the opening is moved toward the main roller, and the read unit performs reading with the movement of the drawing sheet caused by rotation of the main roller.

In accordance with the present invention, it is possible to provide an electronic whiteboard apparatus in which, even when having multiple drawing planes (as many as four or more), it is possible to stably feed the sheet and it is also possible to copy the information drawn on the sheet with a chart and the like put thereon.

Preferably, the electronic whiteboard apparatus of the invention further comprises an instruction unit for instructing to read information drawn on a drawing plane of the drawing sheet exposed through the opening so that control is performed in such a manner that according to an instruction from the instruction unit the drawing plane is moved to a reading position of the read unit and, when the drawing plane reaches the reading position, the information drawn on the drawing plane is read by the read unit while the drawing sheet is being moved, and after the drawing plane has passed over the reading position, the drawing sheet is moved in the reverse direction so that another portion different from the drawing plane is exposed through the opening as a next drawing plane, thereby providing the next drawing plane properly after copying.

BRIEF DESCRIPTION OF THE DRAWINGS

FIG. 7 is an illustration of the electronic whiteboard apparatus of FIG. 1 showing a state in which an auxiliary sheet is put on.

DESCRIPTION OF THE PREFERRED EMBODIMENT

Now, description will be given of an embodiment of the present invention.

Figure 1:
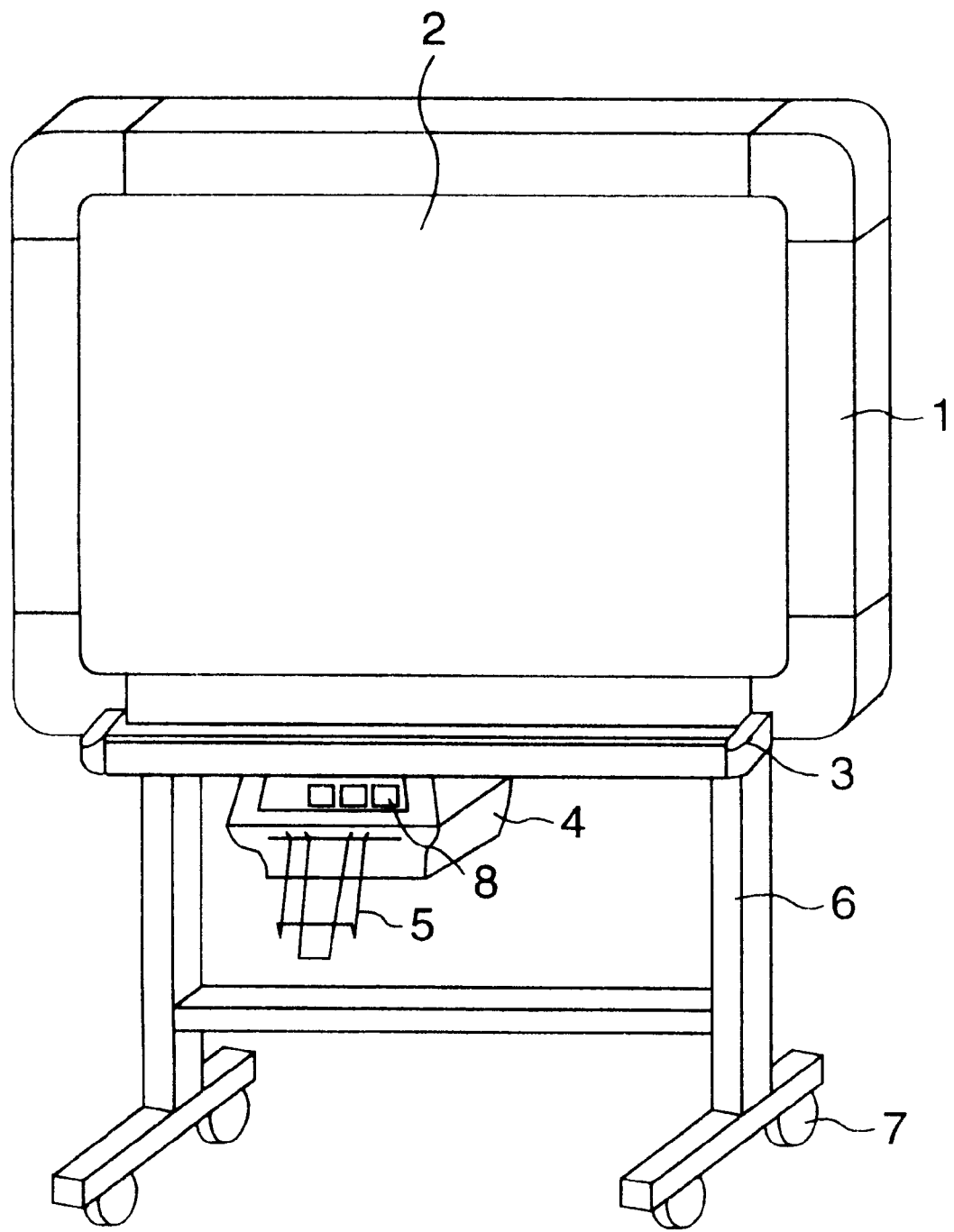
FIG. 1 is a perspective view of an electronic whiteboard apparatus according to an embodiment of the present invention.

FIG. 1 is a perspective view of an electronic whiteboard apparatus according to this embodiment. In FIG. 1, reference numeral 1 denotes a frame; 2, a writing or drawing sheet; 3, a tray on which a pen and the like are put; 4, a printer unit; 5, a paper receiver for printed paper; 6, a leg; 7, a caster; and 8, a control panel provided on the printer unit. Further, in FIGS. 2 and 3, reference numeral 9 denotes a motor; 10, a main roller for moving the drawing sheet 2; 11, 12 and 13, driven rollers which rotate as the drawing sheet 2 is moved by the main roller 10; 14, a fluorescent lamp as a light source; 15, a reflector; 16, a focusing lens; 17, an image sensor; 18, a circuit unit; and 19, print paper.

Figure 6A:
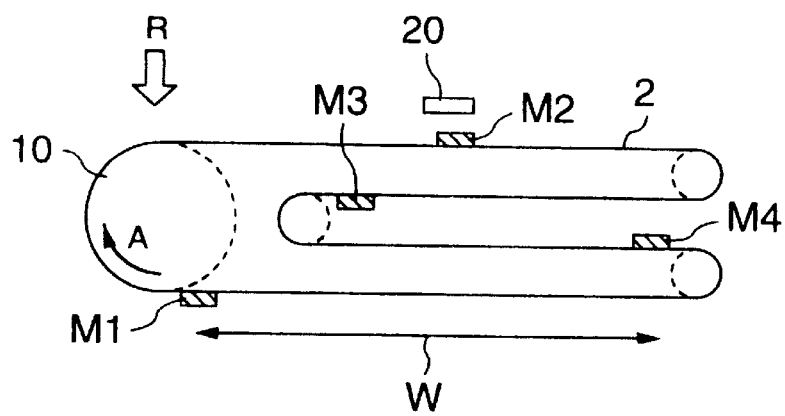
FIGS. 6A to 6D are views for explanation of a copy operation of the electronic whiteboard apparatus of FIG. 1.

As shown in FIG. 6A, home positions M1, M2, M3 and M4 are provided on the drawing sheet 2 so as to be located at the end of each of the drawing planes and outside the drawing area. Reference numeral 20 denotes a home position sensor for detecting the above-described home positions, and 21 denotes a control unit for controlling all of the apparatus.

Figure 2:
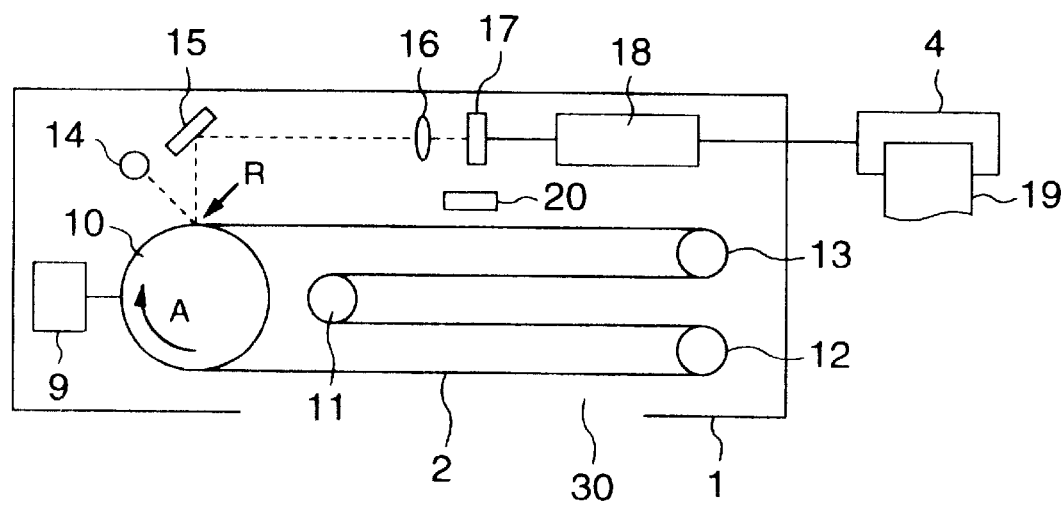
FIG. 2 is an arrangement view of the electronic whiteboard apparatus of FIG. 1.
Figure 3:
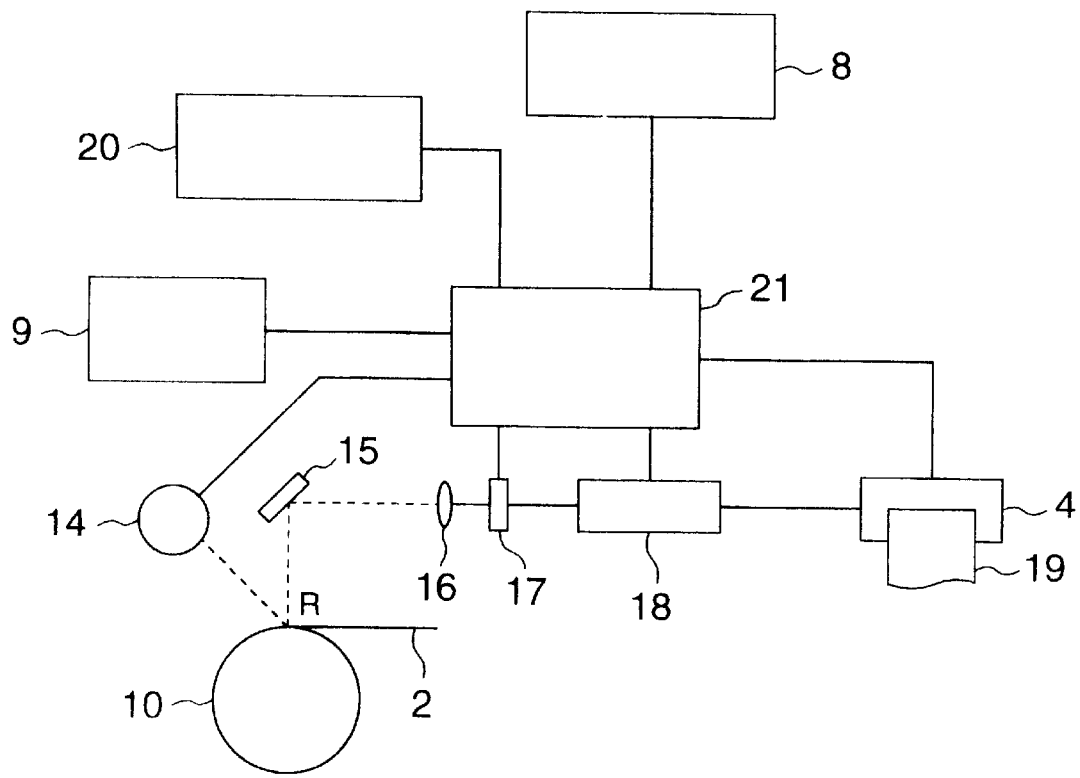
FIG. 3 is a block diagram of the electronic whiteboard apparatus of FIG. 1.

As shown in FIG. 2, the drawing sheet 2 is extended on the main roller 10 and the driven rollers 11, 12 and 13 so as to be folded back once by means of the driven roller 11. The main roller 10 has a diameter larger than (at least not less than twice) the diameter of the driven rollers 11, 12 and 13, thereby making sure of the space for forming the folded portion. A portion of the drawing sheet 2 is exposed through an opening 30 of the frame 1 so as to provide a drawing plane. Due to the above-described folded portion, a total of four drawing planes can be provided. Further, combination of the main roller 10 of large diameter and the driven rollers 11, 12, 13 of small diameter permits the provision of four drawing planes with a simplified structure. Moreover, since the area of contact of the drawing sheet 2 with the main roller 10 is increased, the drawing sheet 2 can be prevented from slipping, thereby avoiding unstable movement of the drawing sheet 2. In addition, since the diameter of the main roller 10 is large, a chart or the like put on the drawing sheet 2 can be prevented from coming off when passing over the main roller 10.

Figure 7:
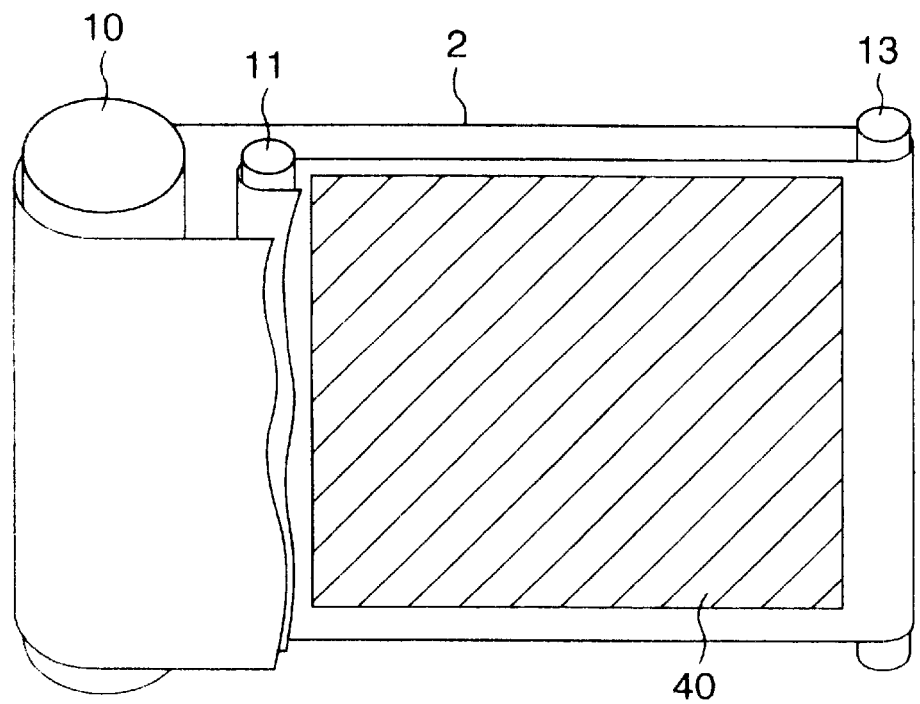
Figure 8:
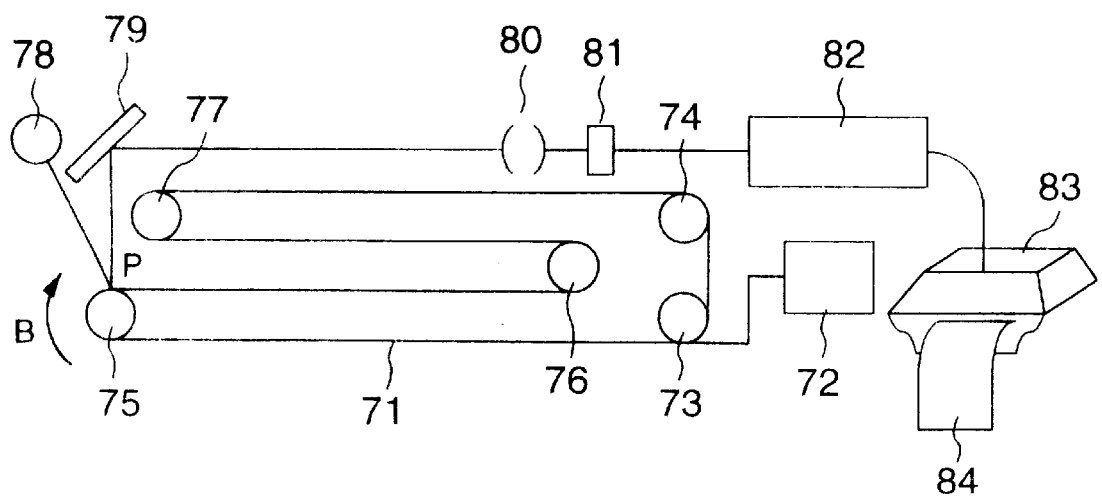
FIG. 8 is an arrangement view of a conventional electronic whiteboard apparatus.

Incidentally, at the above-described folded portion, the surface portions of the drawing sheet 2 are in the face-to-face condition. If the drawing sheet 2 is kept unmoved for a long time during conveyance or the like of the apparatus, the surface portions of the drawing sheet 2 at the folded portion may stick together, resulting in damage of the surface portions when separated in some cases. For this reason, during conveyance or the like, it is necessary to temporarily put an auxiliary sheet 40 made of paper or the like on the surface portions of the drawing sheet 2 at the folded portion as shown in FIG. 7. When using the apparatus, the drawing plane on which the auxiliary sheet 40 is put is moved into the opening 30 and then the sheet 40 is peeled off.

Referring to FIG. 2, in the electronic whiteboard apparatus described above, as an instruction is given from the control panel 8, the motor 9 rotates to cause the main roller 10 to rotate in the direction of arrow A so that the portion of the drawing sheet 2 exposed through the opening 30 is moved toward the main roller 10. Sentences, figures and so on drawn on the drawing sheet 2 are irradiated with light from the fluorescent lamp 14 at a reading position R located at the back of the main roller 10, and reflect the light on the drawing sheet. The reflected light is projected through the reflector 15 and the focusing lens 16 to the image sensor 17. The image projected to the image sensor 17 is transmitted to the printer unit 4. In the printer unit 4, the image is printed on the print paper 19 in accordance with electrical signals from the circuit unit 18. After finishing printing, another drawing plane is provided as a new drawing plane.

It is noted that the positional relationship between the drawing sheet 2 and the optical system can be changed appropriately.

Operation of the electronic whiteboard apparatus of the present invention having the above-described construction will be described in detail in conformity with flow charts shown in FIGS. 4 and 5.

On receiving an instruction given from the control panel 8, the control unit 21 first judges the content of the instruction. If the instruction indicates to feed the sheet (feed: change the drawing sheet 2 to the next drawing plane without copying), the process shown in FIG. 4 is carried out, while if the instruction indicates to copy, the process shown in FIG. 5 is carried out.

Figure 4:
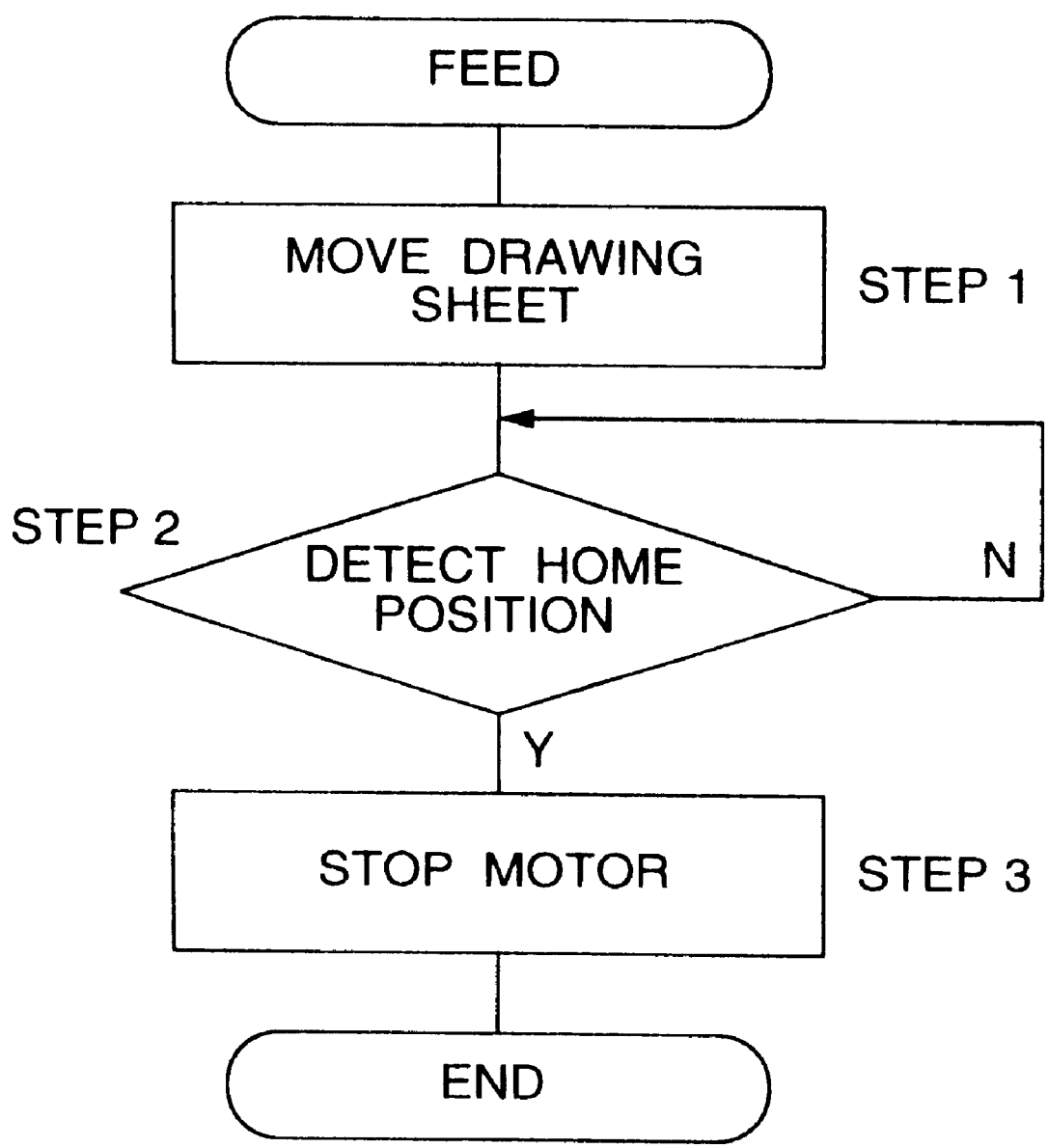
FIG. 4 is a flow chart showing a process of a feed operation of the electronic whiteboard apparatus of FIG. 1.

In the process of FIG. 4, the main roller 10 is first driven by the motor 9 to start movement of the drawing sheet 2 in the direction of the arrow A (Step 1). The control unit 21 monitors the home position sensor 20 while the drawing sheet 2 is being moved (Step 2). The motor 9 is stopped as soon as the home position mark is detected (step 3). In this way, the next drawing plane is provided in the opening 30 of the frame 1.

Figure 5:
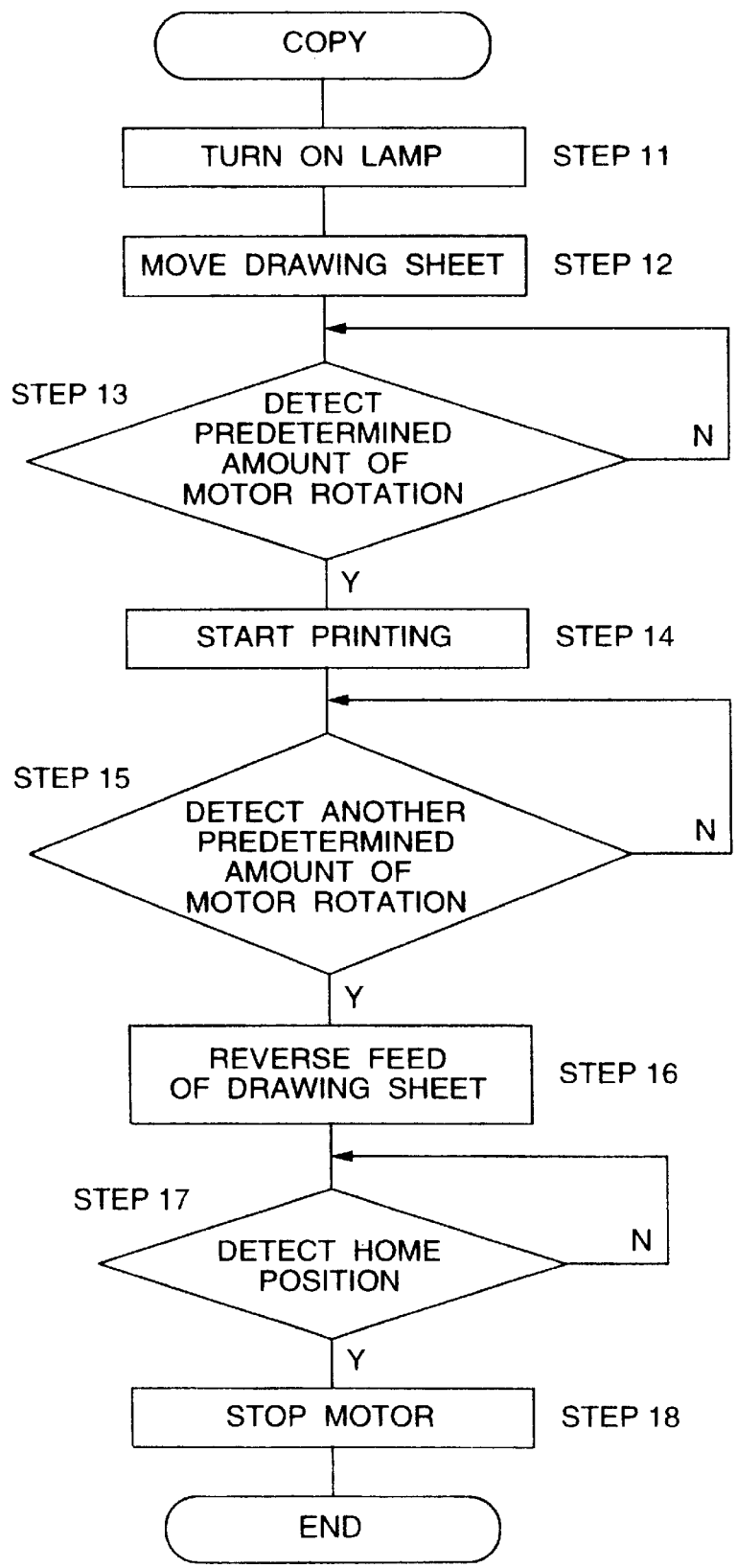
FIG. 5 is a flow chart showing a process of a copy operation of the electronic whiteboard apparatus of FIG. 1.

In the process of FIG. 5, the fluorescent lamp 14 is first turned on (Step 11). Then, the motor 9 is rotated to drive the main roller 10 so as to start movement of the drawing sheet 2 (Step 12). The control unit 21 monitors the amount of rotation of the motor 9 (Step 13). On detecting a predetermined amount of rotation of the motor 9, reading with the image sensor 17 and the circuit unit 18 is started because a starting edge of the drawing plane reaches the reading position R. At the same time, printing is started in the printer unit 4 (Step 14).

The amount of rotation of the motor 9 is further monitored (Step 15). On detecting another predetermined amount of rotation of the motor 9, the fluorescent lamp 14 is turned off and operations of the image sensor 17, circuit unit 18 and printer unit 4 are stopped to make an end of reading because an ending edge of the drawing plane reaches the reading position R. Further, after being stopped temporarily, the motor 9 is rotated reversely so as to start reverse feed of the drawing sheet 2 (Step 16).

After the reverse feed of the drawing sheet 2 is started, the control unit 21 monitors the home position sensor 20 (Step 17). On detecting the home position mark, the motor 9 is stopped (Step 18). In this way, the next drawing plane is provided in the opening 30 of the frame 1 after the copy operation is finished.

Now, the above-described copy operation will be concretely described with reference to FIGS. 6A, 6B, 6C and 6D.

First, in a state that a drawing plane extending over the section indicated by an arrow W is provided as shown in FIG. 6A, if an instruction to make a copy or copies is given, the main roller 10 is rotated in the direction of the arrow A, that is, in the direction in which that portion of the drawing sheet 2 exposed through the opening 30 is moved toward the main roller 10, thereby starting movement of the drawing sheet 2.

Figure 6B:
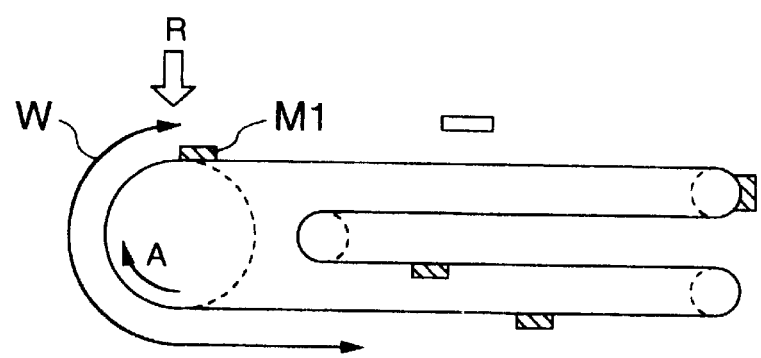
Figure 6C:
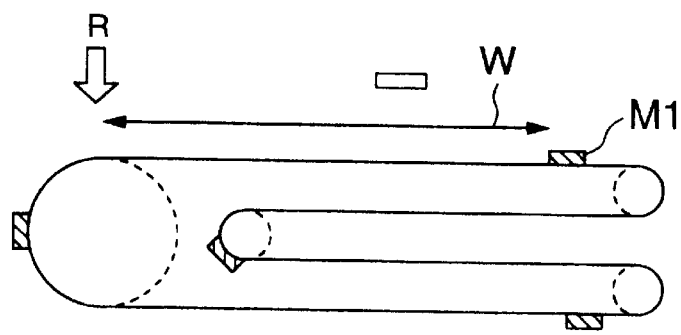
Figure 6D:
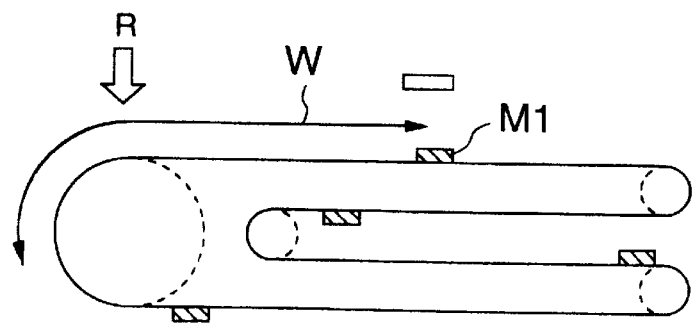

After a predetermined amount of rotation of the motor 9 for driving the main roller 10, the drawing plane reaches the reading position R as shown in FIG. 6B, and therefore reading and printing are carried out. Further, after another predetermined amount of rotation of the motor 9, reading of the drawing plane is finished as shown in FIG. 6C. At this time, the next drawing plane has partially been advanced beyond the opening 30 of the frame 1. Therefore, after finishing reading, the motor 9 is rotated reversely and then stopped when the home position mark M1 is detected. As a result, the next drawing plane can be provided as shown in FIG. 6D.

As has been described above, according to the present invention, it becomes possible to provide an inexpensive multi-plane electronic whiteboard apparatus with a simplified structure. Further, even if copying is carried out with a chart and the like put on the sheet, there will be caused no trouble such as coming-off of the chart.

Incidentally, in another embodiment, after finishing the copy operation, the used drawing plane may be moved back without being replaced by the next drawing plane, differently from the above embodiment. In this case, is advantageously possible to make a copy or copies in the middle of the meeting and use again the same drawing plane.

In the electronic whiteboard apparatus according to the present invention, even when having multiple drawing planes (as many as four or more), it is possible to stably feed the sheet and it also is possible to copy the information drawn on the sheet with a chart and the like put thereon.

What is claimed is:

1. An electronic whiteboard apparatus comprising:

a long drawing sheet;

a frame having an opening through which a portion of said drawing sheet is exposed;

a main roller provided in said frame for moving said drawing sheet;

first and second auxiliary rollers disposed in said frame so as to be opposed to said main roller in a horizontal direction with respect to said opening;

a third roller disposed between said main roller and said first and second auxiliary rollers;

a drive unit for rotating said main roller;

a read unit for reading information drawn on said drawing sheet; and an output unit for outputting the information transmitted from said read unit;

wherein said main roller has a larger diameter than said first, second and third auxiliary rollers, said drawing sheet is extended on said main roller and said first, second and third auxiliary rollers so as to be folded back once by means of said third auxiliary roller, said drive unit rotates said main roller in such a manner that the portion of said drawing sheet exposed through said opening is moved toward said main roller, and said read unit performs reading with the movement of said drawing sheet caused by rotation of said main roller.

2. An electronic whiteboard apparatus according to claim 1, further comprising an instruction unit for instructing to read information drawn on a drawing plane of said drawing sheet exposed through said opening, wherein control is performed in such a manner that according to an instruction from said instruction unit, said drawing plane is moved to a reading position of said read unit and, when said drawing plane reaches said reading position, the information drawn on said drawing plane is read by said read unit while said drawing sheet is being moved, and after said drawing plane has passed over said reading position, said drawing sheet is moved in the reverse direction so that another portion thereof different from said drawing plane is exposed through said opening as a next drawing plane.

* * * * *